United States Patent
Albrecht

[11] 3,907,411
[45] Sept. 23, 1975

[54] PROCESS AND APPARATUS TO FACILITATE CUTTING MOTION PICTURE FILM WITH MAGNETIC SOUND TRACK

[75] Inventor: Hermann Friedrich Albrecht, Hotzum, Germany

[73] Assignee: Rollei-Werke Franke & Heidecke, Braunschweig, Germany

[22] Filed: Apr. 4, 1974

[21] Appl. No.: 457,808

[30] Foreign Application Priority Data
Apr. 18, 1973 Germany............................ 2319633

[52] U.S. Cl........................................ 352/5; 352/29
[51] Int. Cl. ........................................... G03b 31/00
[58] Field of Search............................ 352/5, 27, 29

[56] References Cited
FOREIGN PATENTS OR APPLICATIONS
1,116,446   6/1968   United Kingdom...................... 352/5

Primary Examiner—Monroe H. Hayes
Attorney, Agent, or Firm—Stonebraker, Shepard & Stephens

[57] ABSTRACT

A process for treating amateur motion picture film with magnetic sound track, to enable the film to be cut and spliced, and apparatus for carrying out the process. In the sound track, the sounds which relate to a particular scene or frame of the image track are not recorded alongside of the frame to which they relate, but are recorded in a position offset longitudinally from the frame to which they relate, either ahead of or behind such frame. According to the process of the present invention, the sound track is re-recorded in a position longitudinally displaced from its original position so that each portion of the sound track is opposite (alongside of) the particular frame or scene to which it relates. The film can then be cut and spliced or otherwise edited in the same way that ordinary silent motion picture film is edited. When editing is completed, the sound track is re-recorded again on the film, in the proper longitudinally displaced position (with respect to each frame) so that when it is projected in a conventional amateur projector, the sound will be properly synchronized with the pictures. Apparatus according to the invention includes rollers for guiding the film in a long loop, and a sound pick-up head, erasing head, and recording head acting on the film in this loop and spaced longitudinally from each other in the direction of film travel.

3 Claims, 2 Drawing Figures

US Patent  Sept. 23,1975  3,907,411

PROCESS AND APPARATUS TO FACILITATE CUTTING MOTION PICTURE FILM WITH MAGNETIC SOUND TRACK

BACKGROUND OF THE INVENTION

Except for a few special situations involving special cameras and special projectors, motion picture film provided with a sound track ordinarily has the sounds of the sound track recorded in a position longitudinally displaced from the picture scene or frame to which they relate, the displacement of the sound record being sometimes ahead of and sometimes behind or trailing the related picture frame. This longitudinal displacement is necessary because of the fact that, for proper sound recording and reproduction, the film must move at a uniform rate of travel past the sound recording head (during a recording operation) or past the sound pick-up head (during a sound reproducing operation), whereas the film must travel past the picture film gate intermittently or step-by-step. Hence the sound recording head or pick-up head cannot be alongside the film gate, but must be displaced longitudinally (in the direction of film travel) either ahead of or behind the film gate, to allow enough space between the head and the gate so that the film may form a slack loop to permit the film at the sound head to be moving at a uniform speed while the film at the picture film gate is moving intermittently. This is well understood in the art.

Because of this longitudinal displacement or offsetting of particular sounds on the sound track from the particular picture areas to which they relate, it is impossible to edit amateur sound films with the same ease with which amateur silent films can be edited. Silent films are simply cut transversely to take out an unwanted section of the film strip, or to insert an additional length of film, and the ecut ends are spliced together. But if this is done with a film having a sound track, some of the sound track that relates to the picture frames that are retained will be lost, because of the longitudinal displacement of the sound track relative to the picture frames. Now that the magnetic recording of sound on narrow motion picture film for amateur use has reached a high degree of perfection with available amateur equipment, sound motion pictures have become increasingly popular with amateurs. The present difficulty of cutting and splicing the sound film is a great deterrent to many amateurs, who now find it advisable to record sound on a magnetic tape separate from the motion picture film, if they wish to have sound in conjunction with their movies. This requires, of course, extra equipment, i.e., a tape recorder and reproducer in addition to the motion picture camera and projector.

It is believed, therefore, that motion pictures with sound recorded magnetically directly on the film strip would become much more popular among amateurs, if there were a simple and inexpensive way to provide for editing the film (cutting and splicing) while still keeping intact all of the sound that relates to the picture frames which are retained, and losing only the sound relating to discarded picture frames.

The object of the present invention is to facilitate the cutting and splicing of the amateur motion picture film with a magnetically recorded sound track thereon, and to provide a process and apparatus which will quickly, easily, and economically modify the film in a way so that it can be edited by simple cutting and splicing techniques, and then modify it again after editing is completed, to restore it to proper condition for projection, with the sound track in proper relation to the picture frames.

DESCRIPTION OF THE PREFERRED EMBODIMENT

Figure 1:
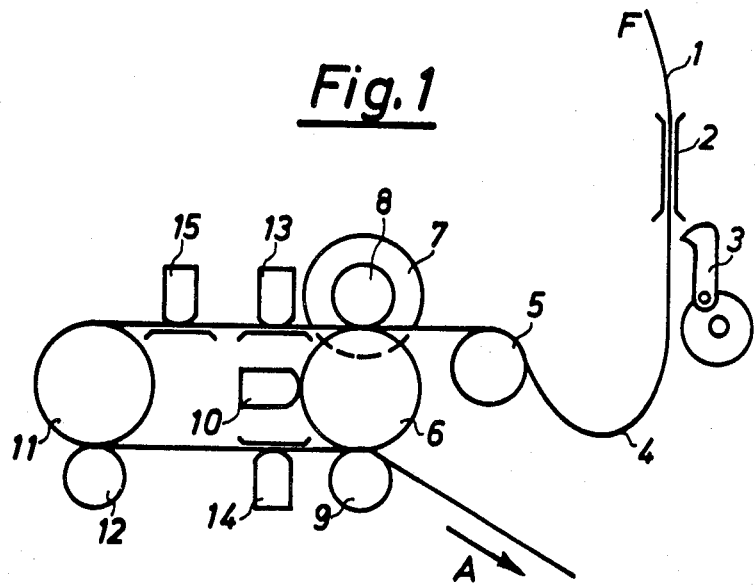
FIG. 1 is a schematic view of film treating apparatus in accordance with one embodiment of the invention.

According to the process or method aspect of the invention, the motion picture film to be edited undergoes two treatments, one before it is edited and the other after it is edited. In the first treatment, before editing, the sound recorded on the film is picked up at one point on the film and re-recorded on the film at another point spaced longitudinally from the pick-up point, the sound track being erased as it passses an intermediate position between the pick-up point and the re-recording point. The pick-up point and the re-recording point are spaced from each other (measured along the path of travel of the film) by exactly the same distance by which a particular sound record on the sound track is offset longitudinally from the picture frame to which the sound relates. The film is run past pick-up point and re-recording point in such direction that when the pick-up and re-recording are completed, any given sound record on the sound track will now be opposite (alongside of) the particular picture scene or picture frame to which it relates.

When this first treatment has been completed, the film is ready for editing (cutting and splicing) in the familiar simple way in which silent films are ordinarily edited by amateurs. Since the sound relating to each frame of the picture strip is alongside of that frame, no sound will be lost in the editing process. All the sound track relating to a particular scene or frame which is to be retained in the finished film, will be preserved.

When the editing is completed, the edited film is again run past the pick-up point and the re-recording point and the intermediate erasing location, so that during this second treatment of the film, the sound track is re-recorded in a location longitudinally offset from the picture scene or frame to which the particular sound relates, so that the sound will be heard in proper synchronism with the projected picture when the film is run through a sound projector, following this second treatment of the film. The offset re-recording position of the sound during the second treatment can be offset either ahead of or behind the picture frame to which the sound relates, depending on the direction in which the film is fed past the pick-up point and re-recording point, the choice being made in accordance with the type of sound projector in which the film is to be projected. Some projectors have the sound pick-up head located in advance of the film gate and others have it located after or behind the film gate. The direction of longitudinal offsetting produced during this second treatment of the film is not necessarily the same as the direction of offsetting in the original film when it was produced.

The apparatus for carrying out the process or method of the present invention may be built into an otherwise conventional projector of the kind for projecting pictures and simultaneously reproducing the sound on the film, or the apparatus may be constructed as a separate unit. Also, the present equipment may be built into a rewind device, or into a viewer intended for editing purposes.

FIg. 1 illustrates the apparatus schematically, as applied to a conventional projector for projecting the pictures and reproducing the sound from the magnetic sound track on the film. The film 1 (indicated also by the character F) comes from the supply reel (not shown) and passes in the usual manner through the picture film gate 2, being moved through the film gate intermittently rather than uniformly, by the conventional claw mechanism or pull-down mechanism indicated schematically at 3. After passing through the conventional compensating loop 4, the film is lead over the feed roller 5 which rotates constantly at a uniform speed. It then passes to the conventional sound take-off drum 6, being driven by the smooth steel drive shaft 8 connected to a flywheel 7 which serves to smooth out any irregularities that would otherwise occur in the drive. As already mentioned, it is important that at the point where the sound is picked up from the sound track, the film should move at an absolutely uniform velocity. The slack loop 4 located between the film gate 2 and the sound take-off drum 6 enables this uniform motion of the film at the drum notwithstanding the fact that the film is moving intermittently or step-by-step at the picture film gate.

In a conventional projector, not equipped with the present invention, the film passes part way around the drum 6, and leaves the drum at the guide roller 9, going thence to the film take-up reel in the direction of the arrow A. While passing partly around the drum, the film sound track passes the conventional sound pick-up head 10, and this pick-up head, together with its conventional electric circuit and loud speaker, serves to reproduce the sound which has been previously recorded on the sound track.

According to the present invention, the above described conventional equipment is modified by providing a second drum 11 spaced at some distance from the drum 6, and a guide roller 12. When using the present invention, the film is looped from the drum 6 around the second drum 11, through the nip between this drum and the guide roller 12, then back to the drum 6 and through the nip between the drum 6 and its guide roller 9, and then exits in the direction of the arrow A. Thus the film, instead of going part way around the take-off drum 6 in the conventional way, is merely tangent to the drum 6 at two points, and forms an extended loop from the drum 6 to the drum 11 and then back to the drum 6.

In traveling through this extended loop, the film passes and is subjected to a sound pick-up head 13 shortly after leaving the drum 6, and a sound recording head 14 at a point on the return stretch of the film from the drum 11 to the drum 6. Also, in any suitable location between the pick-up head 13 and the recording head 14, there is an erasing head 15.

The dimensions are such that the distance from the pick-up head 13 to the recording head 14, measured along the path of travel of the film, is exactly the same as the distance by which a given sound recording on the sound track is offset or displaced longitudinally from the picture frame to which it relates. This is also the same distance as the distance, measured along the path of travel of the film, from the film gate 2 to the pick-up head 13, and from the film gate 2 to the conventional pick-up head 10. In other words, the distance from the point of contact of the film with the feeding shaft 8 to the pick-up head 13 is the same as the distance from this point of contact to the pick-up head 10.

The pick-up head 13 is wired up to the recording head 14 in such a way that the sound picked up at 13 is recorded back on the sound track at 14, the original sound track meanwhile having been erased by the erasing head 15. The pick-up head 10 is ineffective at this time, and the head can be eliminated from the apparatus if desired, or this same pick-up head 10 provided originally in the apparatus can be detachably mounted so that it can be remounted in the position 13 when it is desired to use the apparatus according to the present invention.

With this arrangement, the film can be run through the apparatus for a first treatment which will displace the sound track longitudinally from its original location to a location where each portion of the sound track is opposite (alongside of) the picture area to which it relates. After this first treatment, the film is not suitable for projection, but it is suitable for editing (cutting and splicing) which can now be performed with great ease, just as though it were a silent film rather than a film with a sound track. Then when the editing is completed, the film is run through the present apparatus a second time, to perform a second treatment on the film, which again displaces the sound track longitudinally, so that the recording of a particular sound is offset or displaced longitudinally at the proper distance from the picture area to which it relates. After this second treatment, the film is again ready for projection.

Depending on the direction in which the sound track was offset or displaced longitudinally during the original production of the film (which in turn depends upon the type of equipment used in the original production) the film may be run through the apparatus for its first treatment either in a forward direction, or in a reverse direction, that is, with the film reversed end for end. Similarly, when running the film through for the second time, to produce the second treatment, the film may again be run through forwardly, or reversed end for end. If it is desired, during the second treatment, to displace the sounds on the sound track in the same direction in which they were originally displaced from their respective picture areas or frames before the first treatment of the film, then the film should be run through the apparatus for the second treatment in the opposite direction from the way it was run through for the first treatment. But sometimes it may be desired to reverse the direction of displacement of the sound track as compared with the original direction, as for examle when the film may have been originally produced in apparatus in which the sound recording head was in advance of the film gate, and it may be desired to convert the film for use in apparatus in which the sound head follows the film gate, or vice versa. In such a case, the two treatments of the film are performed by running film through the apparatus in the same direction for both treatments.

The reference to direction and reverse direction does not refer to the direction of rotation of the drum 6 and drum 11, for this is always the same, passing a given spot on the film first to the pick-up head 13 and later to the recording head 14. The reference to direction means the direction in which the film is originally fed into the apparatus, whether starting at the normal beginning of the film, or whether starting at the normal end of the film and progressing to the beginning.

To adapt the apparatus for use with films which have been produced or which are to be projected by equipment which may have different distances from the picture film gate to the recording head or reproducing head, it is advantageous to mount the recording head 14 so that it is adjustable in the direction of travel of the film. Then this head can be adjusted closer to the roller 9 or closer to the roller 12, so that the distance from the pick-up point 13 to the re-recording point 14 will be exactly the same as the distance from the film gate to the sound head in the equipment which was originally used in producing the film, or the distance from the film gate to the sound head in the equipment which is to be used later in projecting the film.

Figure 2:
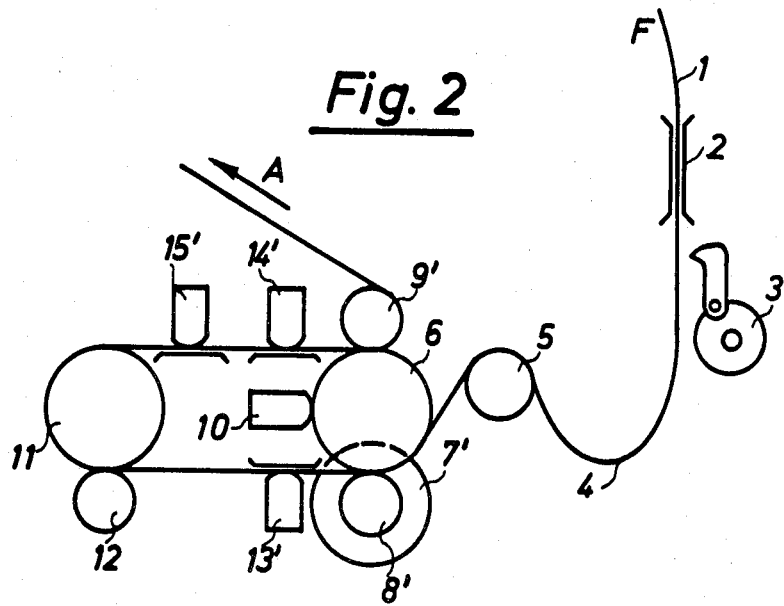
FIG. 2 is a similar view illustrating a second embodiment of the invention.

FIG. 2 shows schematically a variation of the apparatus, where the drums 6 and 11 rotate in the clockwise direction rather than in the counterclockwise direction of FIG. 1, and where the film is fed first to the bottom of the drum 6, and progresses leftwardly in the lower reach or stretch of the loop, then around the dum 11 and rightwardly in the upper reach or stretch, after which it passes around the guide roller 9' and exits to the take-up reel in the direction of the arrow A. Various elements of the structure shown in FIG. 2 are indicated by the same reference numerals used in FIG. 1, with the addition of a prime.

If this apparatus according to the present invention is built into the projector, the original sound pick-up head 10 can be eliminated, and the pick-up head 13 (or 13') can be used as the sound pick-up head for normal projection of the picture, in normal running. Care should be taken, of course, to switch off the recording head 14 and the erasing head 15, when the equipment is used merely for normal projection and without any intention of performing a treatment on the film.

If treatment is desired without necessarily looking at the picture, the running speed can be considerably increased or decreased, so far as this is possible with the frequency characteristics of the electro-acoustical components, that is, so far as there is no deterioration in sound quality.

The electrical circuits for the pick-up head, the re-recording head, and the erasing head may be conventional circuits, well known in the art for use with such heads, and are not illustrated.

What is claimed is:

1. Apparatus for alternative use either for projecting, in normal fashion, an amateur motion picture film with magnetic sound track, or for transferring sound from a portion of said sound tack spaced longitudinally from a picture area to which the sound relates to a portion of said sound track located alongside the picture area to which the sound relates in order to facilitate subsequent cutting and editing of the film, said apparatus comprising a picture projection gate, a first sound pick-up head, means defining a first path of travel of film from said gate to and past said first pick-up head in cooperative relation thereto, a second sound pick-up head, an erasing head, a sound recording head, and means defining a second path of travel of film from said gate to and successively past said second pick-up head, said erasing head, and said recording head in cooperative relation to all of them and in non-cooperative spaced relation to said first pick-up head, said first path of travel being in non-cooperative spaced relation to said second pick-up head, said erasing head, and said recording head.

2. Apparatus as defined in claim 1, wherein said means defining said first path of travel includes a first guide drum so placed that the film passes around a substantial part of the periphery of said first drum, said first pick-up head cooperating with said film while it is passing around said first drum, and wherein said means defining said second path of travel includes a second guide drum so placed that in travelling along said second path the film passes substantially only tangentially in contact with said first drum, then around a substantial part of the periphery of said second drum, then back to make substantially only tangential contact with said first drum, said second pick-up head and said erasing head and said recording head all cooperating with the film, during travel along said second path, after the film leaves its first tangential contact with said first drum and before it makes its second tangential contact therewith.

3. Apparatus as defined in claim 1, wherein the distance, along the respective paths of travel of the film, from said gate to either of said pick-up heads is substantially equal to the distance by which a given portion of the sound track is spaced longitudinally from a picture area to which the sound on that portion relates, and is likewise substantially equal to the distance, along said second path of travel, from said second pick-up head to said recording head.

* * * * *